US012637021B2

(12) United States Patent

Masllorens Torrens et al.

(10) Patent No.: US 12,637,021 B2

(45) Date of Patent: May 26, 2026

(54) METHOD FOR OPERATING A MOBILE DEVICE VIA A MOTOR VEHICLE

(71) Applicant: AUDI AG, Ingolstadt (DE)

(72) Inventors: Marc Masllorens Torrens, Ludwigsburg (DE); Heiko Offenberger, Binau (DE); Daniel Schlüter, Heilbronn (DE); Rene Valnion, Heilbronn (DE); Sebastian Grams, Bad Rappenau (DE)

(73) Assignee: AUDI AG, Ingolstadt (DE)

( * ) Notice: Subject to any disclaimer, the term of this patent is extended or adjusted under 35 U.S.C. 154(b) by 259 days.

(21) Appl. No.: 18/501,246

(22) Filed: Nov. 3, 2023

(65) Prior Publication Data

US 2024/0181981 A1 Jun. 6, 2024

(30) Foreign Application Priority Data

Dec. 1, 2022 (DE) .......................... 102022131853.2

(51) Int. Cl.
| | |
|---|---|
| *H04W 4/48* | (2018.01) |
| *B60R 16/023* | (2006.01) |
| *G07C 5/02* | (2006.01) |

(52) U.S. Cl.
CPC ............ *B60R 16/0231* (2013.01); *G07C 5/02* (2013.01); *H04W 4/48* (2018.02)

(58) Field of Classification Search
CPC ... B60R 16/02; B60R 16/0231; G06F 3/0488; G07C 5/02; H04M 1/724098; H04W 4/48
See application file for complete search history.

(56) References Cited

FOREIGN PATENT DOCUMENTS

| | | |
|---|---|---|
| DE | 102005040065 A1 | 3/2006 |
| DE | 102008021030 A1 | 10/2009 |
| DE | 102016209380 A1 | 11/2017 |

OTHER PUBLICATIONS

Dirscherl, HC.: Apple Carplay Tested : Features , apps, upgrades , wireless CarPlay . Jun. 10, 2022. URL: read://https_www.macwelt. de/?url=https%3A%2F%2Fwww.macwelt.de%2Farticle%2F989848% 2Fapple-carplay-test-funktionen-apps.html (Year: 2022).*
Examination Report issued on May 24, 2023, in corresponding German Application No. 102022131853.2, 10 pages.
Dirscherl., "Apple Carplay in the test: functions, apps, Retrofit solutions, wireless Carplay", Macwelt, 2022, 220 pages.

* cited by examiner

*Primary Examiner* — Charles J Han
(74) *Attorney, Agent, or Firm* — Maier & Maier, PLLC

(57) ABSTRACT

A method for operating a mobile device via a motor vehicle. The method includes providing an application program, in particular an app, on the mobile device; coupling, in particular wireless coupling of the mobile device with the motor vehicle; transmitting control data to an output device of the motor vehicle and outputting output data through the output device; receiving an input at an input device of the motor vehicle; transmitting corresponding input data through the motor vehicle to the mobile device; and using the input data when operating the application program.

7 Claims, 4 Drawing Sheets

METHOD FOR OPERATING A MOBILE DEVICE VIA A MOTOR VEHICLE

FIELD

The invention relates to a method for operating a mobile device via a motor vehicle. The invention particularly expands the possible uses of input devices on a motor vehicle.

BACKGROUND

From DE 10 2016 209 380 A1 it is known to use an internet-capable component of a motor vehicle to purchase goods (such as movie tickets, activation of vehicle functions for navigation, traffic monitoring and/or performance improvement, or the like).

Also in the context of the method according to DE 10 2008 021 030 A1, a mobile phone is used to purchase software for control devices.

It is known from software such as Apple CarPlay®, Android Auto® or MirrorLink® to provide displays on a motor vehicle display originating from a smartphone. The test report by H-C. Dirscherl of a current but not yet available version of Apple CarPlay®, "Apple Carplay im Test: Funktionen, Apps, Nachrüstlösungen, wireless Car-play" dated Jun. 10, 2022, available May 22, 2023 at https://www.macwell.de/article/989848/apple-carplay-test-funktionen-apps.html, describes the possibility of navigation by means of map data displayed by a smartphone on a motor vehicle.

SUMMARY

The steps of the method according to the invention are:
providing an application program, in particular an app, on the mobile device;
coupling, in particular wireless coupling (via WiFi, Bluetooth®, NFC or the like) of the mobile device with the motor vehicle;
transmitting control data to an output device of the motor vehicle and outputting output data (corresponding to the control data) through the output device;
receiving an input at an input device of the motor vehicle;
transmitting corresponding input data through the motor vehicle to the mobile device;
using the input data when operating the application program.

The invention thus uses an exchange of data (i.e. bidirectional) between the mobile device and the motor vehicle to operate the application program.

The method can also be defined as a "method for operating an application program on a mobile device", which includes the above steps, wherein the provision of the application program no longer has to be explicitly mentioned.

Because the application program is provided on the mobile device, its capacities can be used appropriately, especially in a motor vehicle.

The invention separates the computing capacity in the mobile device from that in the motor vehicle. This has the advantage that, in accordance with technical progress, application programs that run on a modern mobile device can also be used in an older motor vehicle, even if the motor vehicle as such would not be able to use this application program. All that needs to be defined is a suitable interface between the mobile device and the existing motor vehicle.

According to the invention, the application program uses access to an external network, in particular the Internet, and it communicates with a data processing device external to the mobile device and also the motor vehicle in the external network (in particular a server thereof or the like), wherein the aim is to obtain (purchase, lease, rent, free download or other use) of a physical item and/or certain data and/or software. In the case of physical goods, these can be purchased via the input device on the motor vehicle, even if the motor vehicle as such—unlike in the above-mentioned case of DE 10 2016 209 380 A1—does not have to be designed to be connected to the external network (the Internet) to communicate. The specific data obtained in the embodiment of the method includes a 3D model of the motor vehicle itself. The data processing device can then be a server assigned to the motor vehicle provider (for example, for which the motor vehicle manufacturer is responsible) (for example: for the "myAudi®" platform). The equipment features of the motor vehicle are known there, so that the 3D model of the vehicle can be provided in a tailor-made manner. For example, streaming data can also be obtained (audio files, video files or much more). The external data processing device can also be the server of an office's cloud facility, so that data that needs to be revised for the office can easily be downloaded. As an example, it is conceivable to download a Microsoft Word® file, to display it on a display device of the motor vehicle using the mobile device (smartphone) and to receive input if necessary ("word file editing", etc.). In addition to Microsoft Word® files, other file formats that are suitable for word processing are also accessible. Furthermore, fixed data such as a PDF file can be downloaded and can simply be viewed. Some PDF files allow input (forms with fields). All of this can be used in the context of the method. Video games can also be an example of the software to be obtained, which can then be played using the input device of the motor vehicle.

It is further preferred in this context that the 3D model and/or software to be obtained are transmitted from the external data processing device to the motor vehicle via the mobile device. In this case, the motor vehicle itself does not have to be linked to the Internet to obtain the data and/or the software, but rather this acquisition takes place using the linked mobile device.

According to another aspect of the invention, the application program, during operation, specifies a reaction to an input (outputs a response), and control data corresponding to the reaction is transmitted to an output device of the motor vehicle, preferably to the same output device of the motor vehicle as before.

In this aspect, it is advantageous that there is a back and forth between the input at the input device of the motor vehicle on the one hand, the use of the generated input data in the application program in the mobile device on the other hand and the enablement of a further reaction. In the example of a video game, the high computing capacity of the mobile device that is suitable for videogaming can be used, which capacity may not be available in the motor vehicle, but at the same time the much more convenient input devices in the motor vehicle can be involved.

According to the aspect, it is in particular provided that the application program queries data from devices of the motor vehicle outside the input device and uses this data in a video game or for forwarding to another mobile device. This expands the range of possibilities of the application program quite considerably.

As an example, it should be mentioned that a steering wheel angle, an engine speed, information about a gear transmission ratio (in the case of manual transmissions: about the gear engaged), information about the gas pedal position, information about the brake pedal position and/or measured values about the vehicle occupant recorded by devices in the motor vehicle are queried.

For example, in a video game that the passenger is using, it is possible to include how the vehicle in which he is sitting is currently being driven by the driver (or driven autonomously as an alternative). The measured values for the vehicle occupant are typically recorded in order to monitor whether the driver is fit to drive (checking for fatigue, alcohol intoxication or the like). The fact that such measured values are used by an application program on a mobile device can have the advantage that modern software can be used that evaluates such measured values. In addition, the mobile device can transmit corresponding data to another mobile device. (In this way, the parents of a young novice driver could be informed about the driving behavior of the novice driver.)

As a further preferred embodiment for using data queried by the vehicle, it can be provided that the application program additionally uses devices on the mobile device to obtain measurement data.

This can be advantageous in order to supplement the sensor technology that is available in the motor vehicle itself. For example, if there is conceivable progress in the software for recognizing traffic signs and the like, the mobile device can use these modern methods, although the motor vehicle as such would not be able to recognize the traffic signs with sufficient reliability. The driver can therefore be given useful help while driving. Furthermore, the mobile device can be used to take a photo or a video of the route, for example, and corresponding data can be included in a video game or a simulation. In particular, it can be the video game used by a vehicle occupant different from the vehicle driver. Current street situations could then be included in the video game. It is also conceivable to use such technical embodiments to design realistic driving simulators, wherein the data are then collected by both the motor vehicle and the mobile device at the same time. In this case, the software is used to create a driving simulation or at least for use in driving simulation software.

According to a further preferred embodiment of the invention, the application program also transmits control commands for devices other than the output device to the motor vehicle. This can particularly relate to actuators for vehicle interior facilities. It is conceivable that the application program assesses what the driver's driving style is like and that, if the assessment is positive, the driver is rewarded by enabling certain presets. For example, a driver who drives calmly and sticks to speed limits could be rewarded by activating a massage function in their seat. (The massage function could possibly be considered too dangerous for a driver driving at high speed.) It is also possible that a video game as an application program enables the acquisition of rewards. For example, if a user has reached a higher level, a function can be activated that was not previously activated (e.g. the aforementioned massage function as a reward for a higher level). Alternatively or additionally, it is possible that the reward consists of other vehicle interior experiences that are offered to the vehicle occupant, for example the activation of a pleasant lounge sound, certain music files, or even the activation of lighting. Furthermore, a direct reaction to actors in the video game is possible, for example by coupling a lighting and/or sound scenario and/or haptic experiences and/or olfactory experiences (release of scents) depending on situations or scenes in the video game.

A usable computer program product for a mobile device, in particular a smartphone or smartwatch or other wearable, stores an application program which, when executed on a data processing device of the mobile device (processor, microcontroller or the like), causes the following:

outputting control data for an output device of a motor vehicle via an interface of the mobile device; and receiving input data from the motor vehicle, wherein the input data are used by the application program.

Here too, it is preferably provided that, as a result of the use, data is again output to an output device and/or other actuators of the motor vehicle and transmitted thereto.

The advantages mentioned for the method apply equally to the computer program product. The motor vehicle used according to the invention comprises an interface for coupling, in particular wireless coupling, with a mobile device, an output device, in particular a display or loudspeaker, an input device, in particular push button, rotary button, touchscreen (preferably uniform with the display), microphone, and it comprises a data processing device which is designed to provide control data received from a mobile device coupled to the motor vehicle to the output device and then to transmit input data received via the input device to the mobile device.

The advantages of the method according to the invention apply accordingly to this motor vehicle.

Preferably, the data processing device is also coupled to devices of the motor vehicle that are not related to the output device or the input device of the motor vehicle and is designed to receive data from these devices and to transmit data to the mobile device. Examples of this have already been mentioned above, such as transmitting the steering wheel angle and the like. For applications or situations that can arise in the method and which are not explicitly described here, according to the method, it is provided that an error message and/or a request for user feedback input is issued and/or a default setting and/or a predetermined initial status are set. The control device for the motor vehicle also belongs to the invention. The control device can have a data processing device or a processor device which is designed to perform an embodiment of the method according to the invention. For this purpose, the processor device can have at least one microprocessor and/or at least one microcontroller and/or at least one FPGA (Field Programmable Gate Array) and/or at least one DSP (Digital Signal Processor). The processor device can also comprise program code, which is designed, upon execution by the processor device, to perform the embodiment of the method according to the invention. The program code can be stored in a data memory of the processor device. A processor circuit of the processor device can have, for example, at least one circuit board and/or at least one SoC (System on Chip).

The invention also includes developments of the motor vehicle used according to the invention, which have features as already described in the context of the developments of the method according to the invention. For this reason, the corresponding developments of the motor vehicle according to the invention are not described again here.

The motor vehicle is preferably designed as an automobile, in particular as a passenger vehicle or truck, or as a passenger bus or motorcycle.

As a further solution, the invention also comprises a computer-readable storage medium, comprising instructions which, when executed by a computer or a computer network, cause it to execute an embodiment of the method according to the invention. The storage medium can be embodied, for example, at least partially as a non-volatile data memory (such as a flash memory and/or as an SSD—solid state drive) and/or at least partially as a volatile data memory (such as a RAM—random access memory). However, the storage medium can also be operated, for example, as a so-called app store server on the Internet. A processor circuit with at least one microprocessor can be provided by the computer or computer network. The commands can be provided as binary code or assembler and/or as source code of a programming language (such as C).

The invention also comprises the combinations of the features of the described embodiments.

The invention therefore also comprises implementations that each have a combination of the features of several of the described embodiments, provided that the embodiments have not been described as mutually exclusive.

BRIEF DESCRIPTION OF THE FIGURES

Exemplary embodiments of the invention are described hereinafter. In particular.

DETAILED DESCRIPTION

Figure 1:
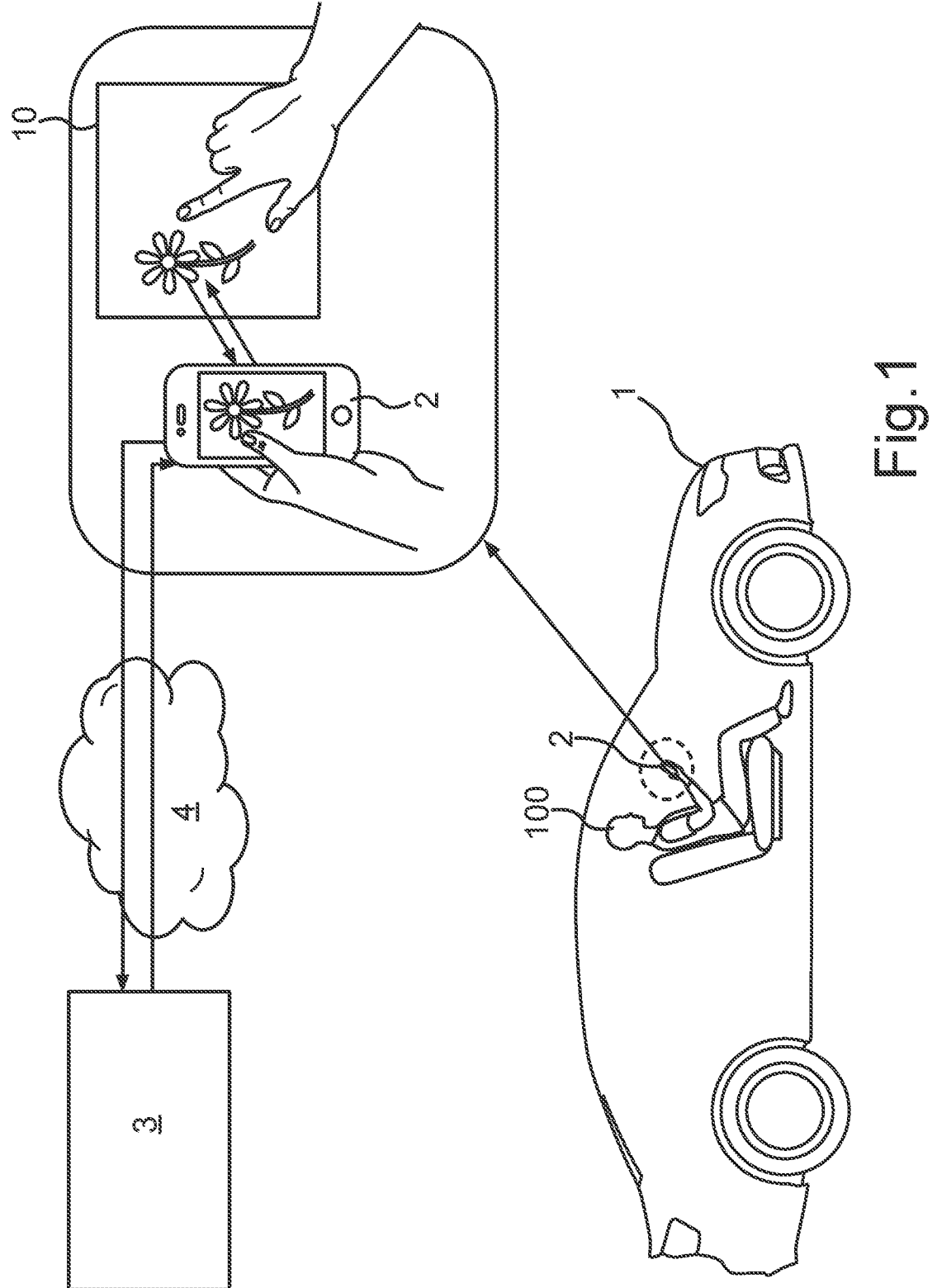
FIG. 1 shows a schematic representation of an overall system used in the context of the method.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

The invention relates to the situation shown in FIG. 1. It relates to the operation of an application program by a person 100 in a motor vehicle 1, wherein the application program is carried out on a mobile device such as a smartphone 2, a smartwatch or similar wearable.

At the top right of FIG. 1 a section of the interior of the motor vehicle is shown. In addition to the smartphone 2 used in the example, a display 10 contained in the motor vehicle 1 can also be seen, which is designed as a touchscreen, and the user 100 can provide input through the touchscreen 10. The smartphone 2 communicates bidirectionally with the motor vehicle, symbolized here by two arrows, in FIG. 1 for the sake of simplicity related to the touchscreen 10 as a display device; in reality, there will be a corresponding interface, for example a known Bluetooth® interface of the motor vehicle 1. The smartphone 2 can also communicate bidirectionally with an external server 3, via the Internet 4.

Figure 2:
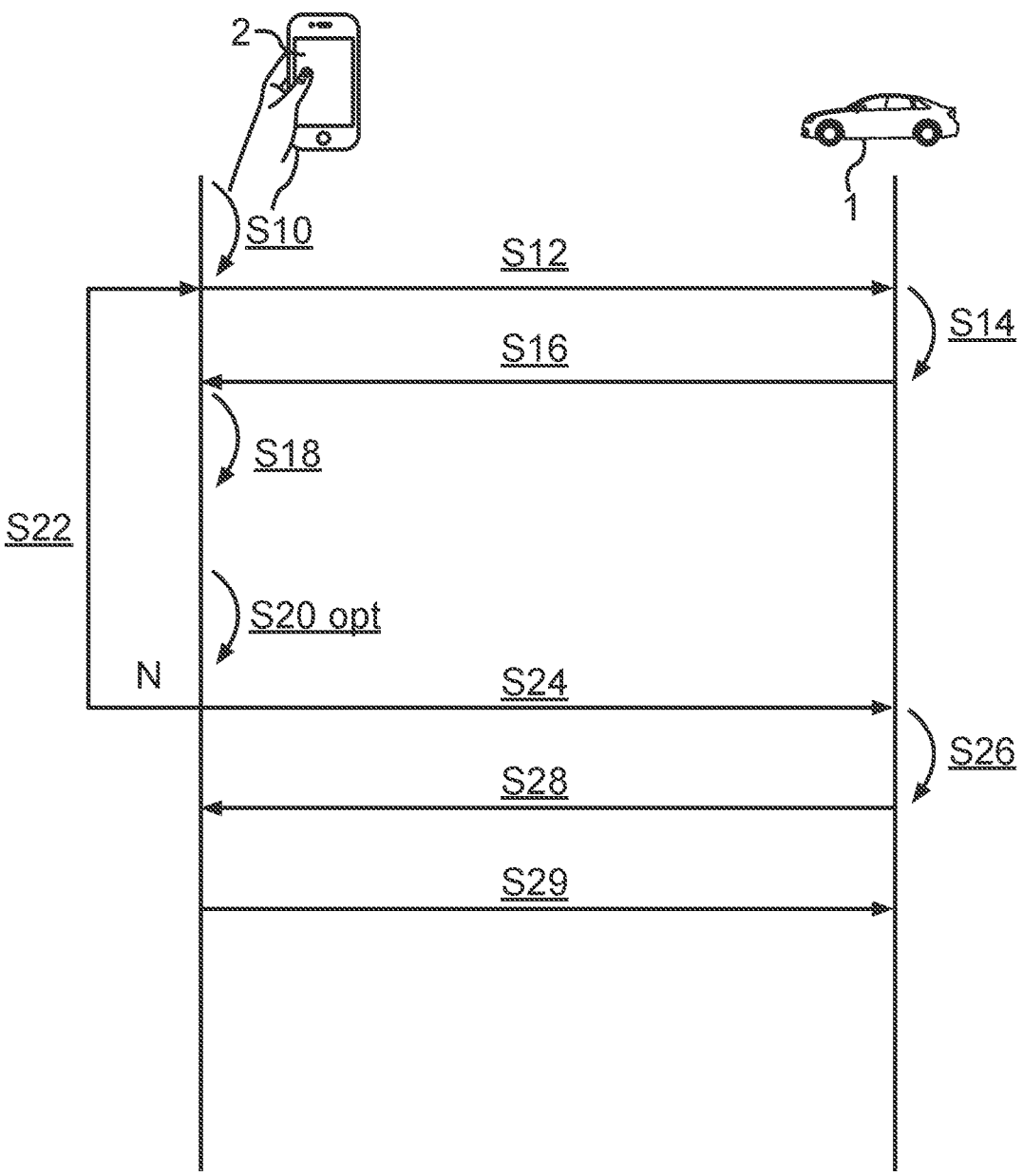
FIG. 2 shows the steps of an embodiment of a method in which the invention is implemented.

FIG. 2 shows a first embodiment of the method according to the invention:

Shown are, on the one hand, the steps related to the smartphone 2 and, on the other hand, the steps related to the motor vehicle 1, as well as the steps that take place as part of the communication between these two units.

In step S10, an application program is started on the smartphone 2 (which program has previously been provided, possibly downloaded from the Internet). In step S12, the smartphone 2 sends data to the motor vehicle 1, which directly or indirectly enables the motor vehicle 1 to control the output device, in this case the touchscreen 10. In step S14, this control of the touchscreen 10 also takes place in the motor vehicle 1. An input can now be made on the touchscreen 10, and corresponding input data is transmitted back to the smartphone 2 in step S16. In step S18, the application program uses this data, i.e. processes it computationally. The optional step S20 includes checking whether a further reaction is necessary with regard to the input. The method shown in FIG. 2 includes two branches that concern the two cases in which this requirement does not exist or is present. Both of these cases can happen during the course of a procedure. However, the method shown can alternatively include only the negative branch or only the positive branch, so that step S20 can then be omitted. The negative branch (N for "NO" or "NO") contains a return in step S22 to step S12, so that the output on the motor vehicle 1 is changed again and then an input is made. For example, this can happen as part of a video game that runs as an app on the smartphone 2 but is played via the touchscreen 10 of the motor vehicle 1.

As part of the video game, it can happen that the player is supposed to receive a reward (new levels reached, bonus points achieved, or the like). In this case, the answer to the test in step S20 would be positive (Y for English "YES"), so that in step S24 a corresponding query is made to the motor vehicle 1, wherein in an exemplary case the motor vehicle determines its own state in response to the query in step S26 (e.g. "lighting in the motor vehicle is white") and a corresponding information is returned to the smartphone 2 in step S28. In step S29, the smartphone 2 instructs the motor vehicle 1 that an actuator of the motor vehicle 1 assumes a changed state. For example, as a bonus in the game it can be provided that the white lighting in the motor vehicle changes to red lighting. Alternatively, after step S20, one can go directly to step S29 and actuate an actuator the status of which does not need to be queried beforehand. As a bonus in the video game, a massage function of the player's seat can be activated according to commands in step S29.

Figure 3:
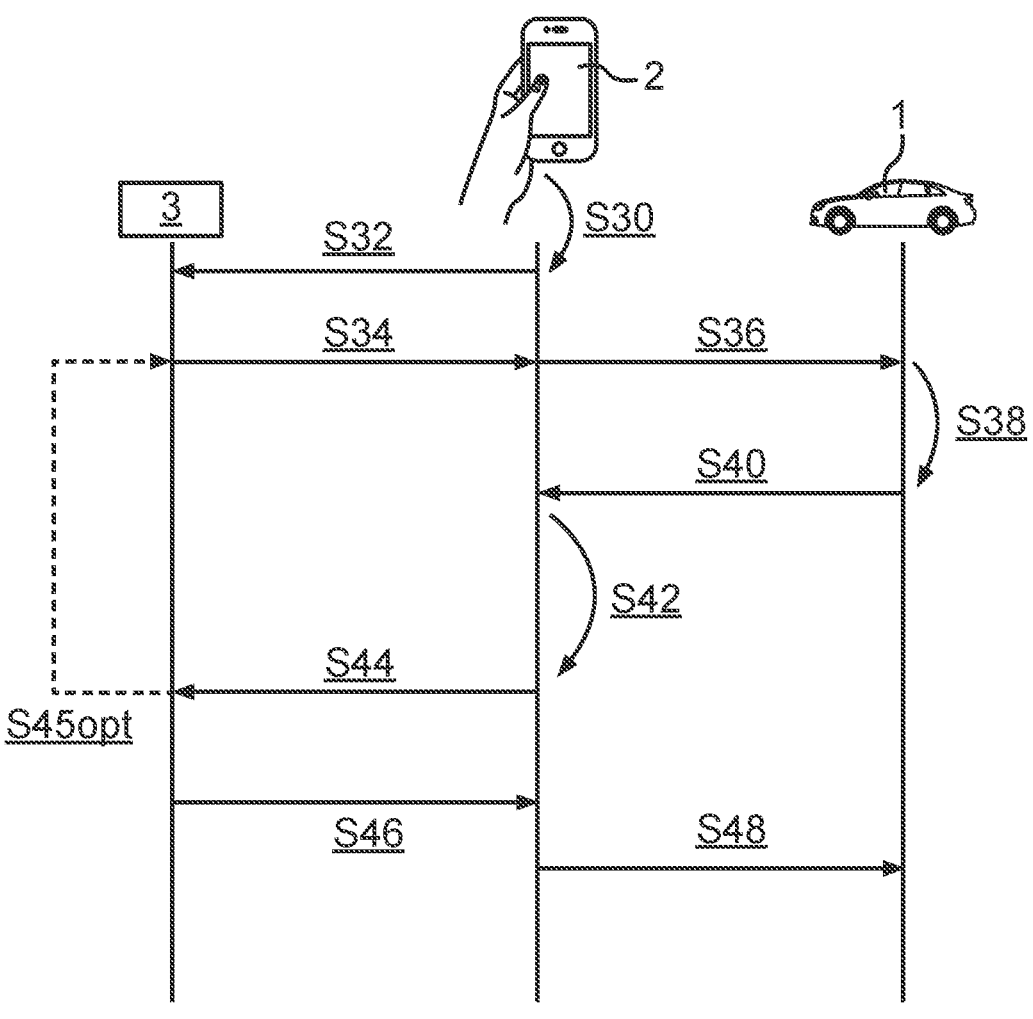
FIG. 3 shows steps of another method in which the invention is implemented.

FIG. 3 illustrates another embodiment of the method according to the invention. However, steps S30 to S48 can precede the method according to FIG. 2. This particularly concerns the purchase or other acquisition of data for use in the motor vehicle 1.

The method starts over in step S30 by activating the app on the smartphone 2. This can be an app for purchasing goods, for example software or even data or even physical objects, on the Internet. In step S32, the app 2 opens a corresponding website or another data source on the external server 3. Corresponding information and data are transmitted to the smartphone 2 in step S34. As is known from browsing, the website or the like provided by the server 3 would now be shown on the smartphone screen. In the present case, corresponding output data is transmitted to the motor vehicle 1, wherein input occurs through the touchscreen S38. The corresponding input data is transmitted to the smartphone 2 in step S40, and the application program uses this data in step S42 to transmit the corresponding inputs to the server 3, see step S44. In this way, from the motor vehicle 1, the user can browse the Internet and make a purchase on the server 3. FIG. 3 illustrates here only a one-time entry of data into the motor vehicle 1, but obviously steps S34 to S44 can be repeated, as indicated by the optional return step S45 opt. Otherwise, the method goes straight to step S46, i.e. a purchase confirmation is made and, when purchasing data and/or software, the same is transmitted to the smartphone. The smartphone 2 transmits this data and/or software to the motor vehicle 1 in step S48. This software can now be used in the motor vehicle 1. It can be software that can be used by control devices in the motor vehicle.

Alternatively, the method may end in step S46. In this case, software for the smartphone would be purchased from the motor vehicle 1. This can be a video game that can be played in the manner of the method shown in FIG. 2; step S10 for activating the video game would then follow step S46 (or optionally step S48).

An example of acquired data can be a three-dimensional representation of a motor vehicle, in particular the motor vehicle on which this data is then displayed. The use of the method is particularly helpful here if the technological progress of the smartphone provides an improvement in the representation of such three-dimensional images, compared to representations that can be achieved by the motor vehicle and its data technology devices. According to the method that has just been explained with reference to FIG. 3, a three-dimensional representation of the motor vehicle 1 would be purchased from or at the server 3. In this case, in the context of step S38, the motor vehicle 1 could provide a query regarding the equipment features of the motor vehicle 1, in which case, in step S40, in addition to what has already been mentioned, data on the equipment features of the motor vehicle 1 would also be transmitted to the smartphone 2. Corresponding information and data would then be transmitted to the server 3 in step S44. In the server 3, in a step not shown in FIG. 3, the three-dimensional image would be calculated based on the equipment data. For example, a particularly low-lying motor vehicle 1 can receive an image that matches its lowering. Data on spoilers and similar equipment features could also be stored, which would be shown in the three-dimensional image. As an alternative to this transmission of data originating from the motor vehicle 1, it can be provided that the server 3 already manages data about the motor vehicle 1, i.e. it "knows" the characteristics of the motor vehicle 1, so that corresponding data is taken into account when this server is queried. For example, it may be a server responsible for providing a user platform (such as the one known from Audi as "myAudi®") by the car manufacturer or another vendor.

Figure 4A:
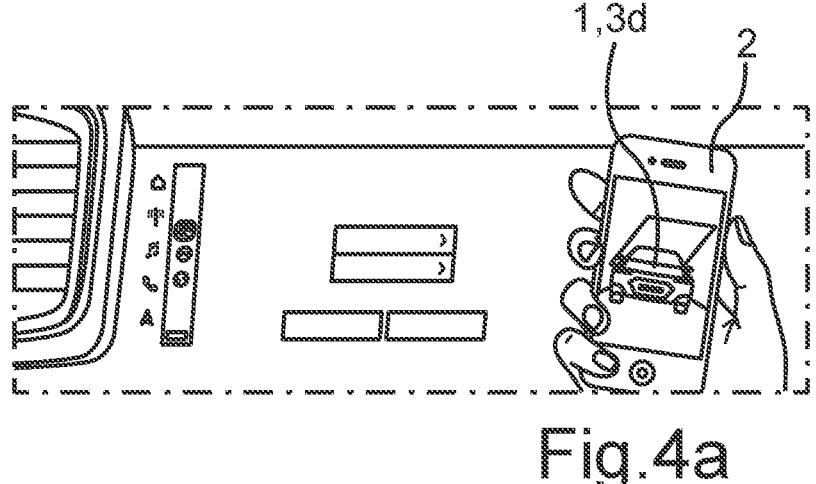
FIG. 4a shows the transmission of a 3D model of a vehicle to an output device of the motor vehicle as an example of use of the method according to the invention.

FIG. 4a shows how an image of the motor vehicle 1, the three-dimensional image 1,3d, is displayed on the display of the smartphone 2. This would correspond to a situation after step S46 and immediately before step S48.

Figure 4B:
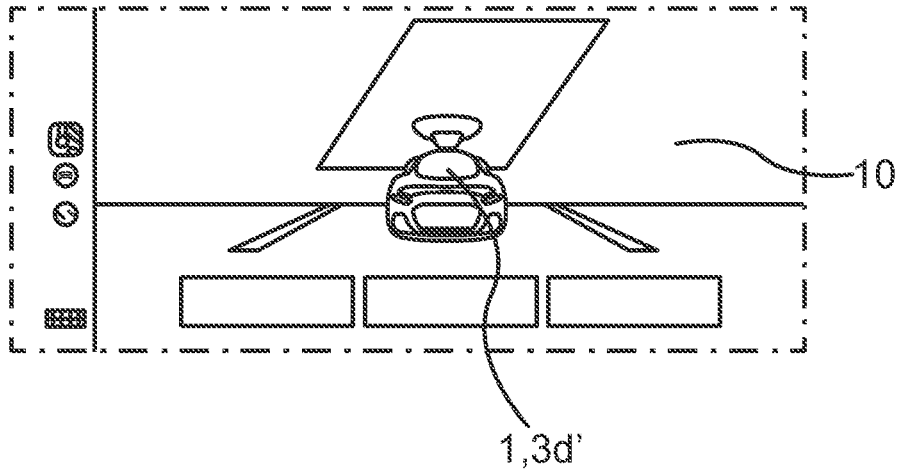
FIG. 4b shows the transmission of a 3D model of a vehicle to an output device of the motor vehicle as an example of use of the method according to the invention.

FIG. 4b shows that the corresponding image of the motor vehicle 1 is displayed in a variant as an image 1,3d' on the touchscreen 10. This is the situation after step S48.

The method can use known technical means to couple the smartphone 2 with the display of the motor vehicle, such as Apple CarPlay®, Android Auto® or MirrorLink®.

In addition, as part of the method, it can be provided that the application program knows the type of display 10 of the motor vehicle and makes appropriate adjustments to the representation. For example, it may be that the display of the smartphone has a different representation ratio than the display of the motor vehicle, which can already result from the typically transverse display of the motor vehicle. Suitable conversions and the like can be made here so that the illustrations and images are optimally displayed on the display 10 of the motor vehicle. In particular, adjustments can be made to the images shown. Special fields can be provided in the images displayed on the touchscreen in order to provide input. Thus, in the example of FIG. 4b, it would be possible to provide the region intended for the license plate of the motor vehicle as an input mask, via which the vehicle user (person 100 from FIG. 1) can then enter the actual license plate of her motor vehicle, wherein this will then be displayed later on the 3D model. Here, further transmissions can be made not only to the smartphone 2, but also to the server 3.

In addition to using its computing power, the use of a smartphone also has the advantage that data stored on the smartphone can still be used, which can refer, for example, to payment technologies (Apple Pay, credit card, PayPal, etc.), so that, purchases can be made from the motor vehicle using payment methods that are not necessarily linked to the motor vehicle. In addition, when purchasing videos, a so-called REST-API (Representational State Transfer-Application Programming Interface) provides a connection to the backend of the respective video-on-demand service on the smartphone.

Overall, the examples show how a digital marketplace can be provided in the vehicle.

The invention claimed is:

1. A method, comprising:

providing an application program on a mobile device;

coupling the mobile device with a motor vehicle;

transmitting control data to an output device of the motor vehicle and outputting output data through the output device;

receiving an input at an input device of the motor vehicle;

transmitting corresponding input data through the motor vehicle to the mobile device;

using the input data when operating the application program, wherein the application program accesses an external network, communicates with an external data processing device external to the mobile device and the motor vehicle in the external network, and receives transaction confirmation data representing a purchase of a downloaded executable software from the external data processing device, the executable software being installable on or executable by at least one of the mobile device and the motor vehicle, and wherein the transaction confirmation data and the downloaded executable software is transmitted from the external data processing device to the motor vehicle via the mobile device, wherein the downloaded executable software is a 3D model of the motor vehicle, the 3D model being based on equipment data of the motor vehicle.

2. The method according to claim 1, wherein the application program transmits control commands to actuators of the motor vehicle other than the output device.

3. The method according to claim 1, wherein the application program transmits control commands to actuators of the motor vehicle other than the output device.

4. The method according to claim 1, wherein the mobile device comprises one of a smartphone, a smartwatch, and another wearable device.

5. The method according to claim 1, wherein the application program comprises an app installed on the mobile device.

6. The method according to claim 1, wherein the external network comprises the Internet.

7. The method according to claim 1, wherein the external network comprises the Internet.

* * * * *